US011669952B2

(12) United States Patent
Kazmi et al.

(10) Patent No.: US 11,669,952 B2
(45) Date of Patent: Jun. 6, 2023

(54) TYRE SIDEWALL IMAGING METHOD (71) Applicant: WheelRight Limited, Oxfordshire (GB)

(72) Inventors: Syed Wajahat Ali Shah Kazmi, Oxfordshire (GB); Alexander Paul Codd, Oxfordshire (GB)

(73) Assignee: WheelRight Limited, Oxfordshire (GB)

( * ) Notice: Subject to any disclaimer, the term of this patent is extended or adjusted under 35 U.S.C. 154(b) by 32 days.

(21) Appl. No.: 17/610,928

(22) PCT Filed: Apr. 23, 2020

(86) PCT No.: PCT/EP2020/061324
§ 371 (c)(1),
(2) Date: Nov. 12, 2021

(87) PCT Pub. No.: WO2020/229132
PCT Pub. Date: Nov. 19, 2020

(65) Prior Publication Data
US 2022/0245956 A1  Aug. 4, 2022

(30) Foreign Application Priority Data
May 14, 2019  (GB) ..................... 1906788

(51) Int. Cl.
G06V 30/18 (2022.01)
G06T 7/00 (2017.01)
(Continued)

(52) U.S. Cl.
CPC .......... G06T 7/0004 (2013.01); B60C 13/001 (2013.01); G06T 3/0093 (2013.01);
(Continued)

(58) Field of Classification Search
CPC ....... G06T 7/0004–0008; G06T 3/0093; G06T 5/40; G06V 30/18057; G06V 30/19127;
(Continued)

(56) References Cited

U.S. PATENT DOCUMENTS 9,454,707 B1    9/2016  Tracy et al.
2012/0120444 A1* 5/2012  Hirohata ................. H04N 1/12
                                                     358/1.15
(Continued)

FOREIGN PATENT DOCUMENTS

CN    108288037 A      7/2018
CN    109446984 A      3/2019
WO    2019/084385 A1   5/2019

OTHER PUBLICATIONS

International Preliminary Report on Patentability for Application No. PCT/EP2020/061324, dated Nov. 25, 2021, 8 pages.
(Continued)

Primary Examiner — Sean T Motsinger (57) ABSTRACT

A computer implemented method is proposed for classifying one or more embossed and/or engraved markings on a sidewall of a tyre into one or more classes comprising digital image data of the sidewall of the tyre. The method comprises generating a first image channel from a first portion of the digital image data relating to a corresponding first portion of the sidewall of the tyre. Generating the first image channel comprises performing histogram equalisation on the first portion of the digital image data to generate the first image channel. The method further comprises generating a first feature map using the first image channel and applying a first classifier to the first feature map to classify said embossed and/or engraved markings into one or more first classes.

18 Claims, 5 Drawing Sheets (51) Int. Cl.
    *G06V 30/19* (2022.01)
    *G06V 30/146* (2022.01)
    *G06V 30/414* (2022.01)
    *B60C 13/00* (2006.01)
    *G06T 3/00* (2006.01)
    *G06T 5/40* (2006.01)
    *G06V 10/80* (2022.01)
    *G06V 10/82* (2022.01)
    *G06V 20/10* (2022.01)
    *G06V 20/62* (2022.01)

(52) U.S. Cl.
    CPC .............. *G06T 5/40* (2013.01); *G06V 10/806* (2022.01); *G06V 10/82* (2022.01); *G06V 20/10* (2022.01); *G06V 20/63* (2022.01); *G06V 30/147* (2022.01); *G06V 30/18057* (2022.01); *G06V 30/18095* (2022.01); *G06V 30/19127* (2022.01); *G06V 30/414* (2022.01)

(58) Field of Classification Search
    CPC ........... G06V 30/18095; G06V 30/147; G06V 30/414; G06V 10/806; G06V 10/82; G06V 20/63; G06V 20/10
    See application file for complete search history.

(56) References Cited

U.S. PATENT DOCUMENTS

| | | | |
|---|---|---|---|
| 2012/0207340 A1* | 8/2012 | Bulan | G01M 17/027 382/100 |
| 2016/0224863 A1* | 8/2016 | Lee | G06V 30/1475 |
| 2022/0051391 A1* | 2/2022 | Bogomolny | G01N 21/952 |
| 2022/0245956 A1* | 8/2022 | Kazmi | G06T 7/0004 |

OTHER PUBLICATIONS

International Search Report and Written Opinion for PCT Application No. PCT/EP2020/061324, dated Jul. 23, 2020, 14 pages.
Huang et al., "Fast Intellective Recognition of Autocar Tire Character based on Canny Operator", SPIE, 2007, vol. 3833, 7 pages.
Koo et al., "MCBP neural network formation for efficient recognition of tire sorting code by image processing", Circuits and Systems, Nov. 1996, IEEE Asia Pacific Conference on Seoul, South Korea, pp. 524-527.
Combined Search and Examination Report for GB Application No. 1906788.3, dated Nov. 8, 2019, 7 pages.

* cited by examiner

TYRE SIDEWALL IMAGING METHOD

CROSS-REFERENCE TO RELATED APPLICATION

This application is a national phase application of International Application No. PCT/EP2020/061324, filed on Apr. 23, 2020, and entitled "TYRE SIDEWALL IMAGING METHOD", which is based on and claims priority to and benefit of British Patent Application No. 1906788.3, filed on May 14, 2019. The entire disclosures of all of the above-identified applications are incorporated herein by reference.

TECHNICAL FIELD

The present invention relates to a computer implemented method for classifying one or more embossed and/or engraved markings on a sidewall of a tyre into one or more classes, for training a classifier to perform this task, and for generating a training data set to train the classifier.

BACKGROUND

The outward face of vehicle tyres, known as the tyre sidewall, carries text-based information regarding tyre brand, model as well as some codes. The codes carry information about, for example, manufacturing plant, tyre age, tyre type, intended load, speed rating and size, manufacturing batch information, and other product information. The codes may comprise, for example, a mix of one or more letters and/or numbers. Furthermore, the sidewall may also have other informative text, logos, symbols, pictograms, and/or any other visual representation of information. For vehicle users, especially fleet operators, different bits and pieces of this information are critical since it provides a consistent and reliable way to track tyre usage and condition across a fleet of vehicles, thereby greatly enhancing the ability of the fleet operator to carry out data analytics on the fleet's stock of tyres.

There have been attempts to automate the process of reading a tyre sidewall, however such systems are either 3D scanner based systems for use in indoors and controlled inspection tasks (available from MicroEpsilon, Cognex, and Numetrix) or handheld laser devices for both indoor and outdoor applications. Such systems are either expensive to manufacture given the structured laser light components, challenging to calibrate, prone to breaking and/or still require human operator assistance so cannot be said to be truly automated and cost effective.

Applying optical character recognition (OCR) on images taken without structured light would significantly reduce hardware costs. However, because outdoor use of tyres leads to wearing of the sidewall text (for example due to material erosion, dust, dryness and/or humidity), and because the text has a very low contrast (black-on-black) which is at times challenging even for human observers to decipher, let alone for an automated system, previous attempts based on colour or grayscale image OCR have not been successful.

A challenge in producing such a system is that it is desirably fast enough to read the text both on a moving vehicle tyre as it drives past the system or on a stationary tyre as the field of view of the system is moved over the tyre. It is also desirable to be able to compensate for variable conditions (e.g. different weather conditions outdoors and/or dusty/dirty conditions indoors at a fleet depot), and to produce accurate and reproducible results without assistance from a human operator.

An imaging system which provides enhanced contrast images is proposed in WO2017060739 A1. In particular, for reading embossed or engraved text such as a tyre sidewall code, lighting is important because the contrast and thus legibility of the text can be improved through shadow casting. Whilst WO2017060739 A1 proposes using image analysis software to perform OCR on such images to read embossed markings, conventional OCR techniques as described in WO2017060739 A1 do not perform well because they are too slow and/or have low accuracy in non-ideal, non-laboratory settings.

Recent developments in deep learning based image classification and text recognition have pushed deep convolutional neural networks (CNNs) to the top of performance tables for object and text detection and recognition tasks. A known type of CNN suitable for such tasks is a Faster R-CNN which was first proposed in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc.

Faster R-CNNs have a deep CNN feature extractor called a backbone. There are many known deep CNN feature extractors that can be used as a backbone; examples include VGG16, ResNet50, ResNet100, InceptionNet, AlexNet, and others. VGG16 was first proposed in K. Simonyan, A. Zisserman, Very Deep Convolutional Networks for Large-Scale Image Recognition, arXiv technical report, 2014.

As explained in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc, the backbone feature extractor branches out to an in-built Region Proposal Network (RPN) which proposes regions of interest (also referred to as proposals) to be further processed by a classifier. The classifier classifies the contents of the proposals of the RPN into predetermined classes according to the training data.

Other examples of known CNNs which have been used for object and text detection and recognition include Fast R-CNN, R-CNN, SPPNet, SSD, YOLO v1/v2/v3, and EAST text detector.

A problem with applying such CNNs to the task of reading a tyre sidewall is that, as indicated above, images of tyre sidewalls frequently have very low contrast between the background tyre sidewall and the embossed and/or engraved markings. This is particularly true of older, worn out tyres where the embossed and/or engraved markings have partially worn away and which are difficult to read even to the human eye. Increasing the camera resolution used for image capture can help to ensure image data relating to worn away embossed and/or engraved markings is not entirely lost against the background. High resolution as referred to herein means where, after the curvature of a tyre sidewall in the image is unwarped i.e. removed during pre-processing, an image has a resolution of around 500×2000 to 500×4000 pixels in general.

However, as is known in the art, the use of high resolution images as input to CNNs is significantly slower and requires greater processing resources, both to train the CNN and to infer unseen data at test time. Whilst powerful graphics processing units (GPUs) can be used for such tasks, they have a high monetary cost compared to cheaper but less powerful central processing units (CPUs).

Therefore, an improved computer implemented method of classifying embossed and/or engraved markings on a sidewall of a tyre is ideally required which may be implemented efficiently on, for example, a CPU.

The following terms are given the following meanings herein:

"unwarping"—mapping an image of a curved tyre sidewall to an image where the curve has been removed or straightened;

"image channel"—one or more predefined components of image data underlying a digital image;

"synthetically generated/synthetic data"—data generated using an algorithm and used to increase the total volume of data available for training, for example where only limited data from other sources is available;

"duration of training"—time taken for a CNN to converge to predetermined acceptable precision and recall;

"at test time"—when a trained CNN performs the task it has been trained to do, for example, when a trained CNN classifies one or more embossed and/or engraved markings on a sidewall of a previously unseen tyre into one or more classes.

"histogram equalisation"—a method in image processing of contrast adjustment applied to an original image, by forming a histogram of the distribution of intensity values of the original image over a plurality of intensity value ranges, determining based on the histogram a mapping between intensity values of the original image and modified intensity values, and modifying the intensity values of the original image according to the mapping to produce a modified image, where the mapping is chosen such that the distribution of the pixel intensities among the intensity ranges is more uniform in the modified image than in the original image according to a uniformity criterion, such as reduced variance in between retrospective intensity ranges of equal width.

"adaptive histogram equalisation"—a method in image processing of contrast adjustment in which histogram equalization is performed for each pixel or pixel region of an original image using a corresponding mapping defined using a neighbourhood of the pixel or pixel region (e.g. a portion of the original image within a predetermined distance of the pixel or pixel region);

"anchor"—a feature on an image known from prior knowledge to be indicative of the presence and position of other features on the image;

"Difference of Gaussians (DoG)"—a method in image processing of feature enhancement where a blurred version of an original image is subtracted from another, less blurred version of the original, and where the blurred images may be obtained by convolving the original image with Gaussian kernels having differing standard deviations;

"CPU" and "GPU"—a central processing unit and a graphical processing unit, the GPU being configured to provide more processing cores running at a lower clock speed than the fewer processing cores of a CPU which run at a higher clock speed.

SUMMARY OF INVENTION

In general terms, the invention relates to improving the efficiency with which a trained CNN can classify embossed and/or engraved markings on images of tyre sidewalls, and to reduce the time required to train the CNN to perform that task. In particular, instead of generating a feature map using the initially obtained unwarped image data, histogram equalisation is performed on the unwarped image data first to generate a new image channel. This new image channel is used to generate the feature map used to classify the embossed and/or engraved markings. This results in a reduction in both the duration of training and the processing resources required to classify the embossed and/or engraved markings at test time to an acceptable level of accuracy.

Further improvement of accuracy of the classifier is achieved when the feature map is generated not from a single image channel but from a three image channel input made up of the above described histogram equalisation channel as a first channel, a second image channel generated by performing adaptive histogram equalisation on the initial unwarped image data, and a third image channel comprising the initial unwarped image data.

The inventors found that the duration of training of a Faster R-CNN using the above three image channels was about 8-10 times faster than the duration of training of a Faster R-CNN using only the initially obtained unwarped image data as a single image channel. The test accuracy on previously unseen data was also higher.

At test time, the inventors further found that a Faster R-CNN trained using the above three image channels and tested on down sampled images (50%) was able to run in real time on a CPU, rather than a more expensive GPU, to classify the embossed and/or engraved markings.

The invention thus provides a faster and cheaper way to train a CNN to classify embossed and/or engraved markings on tyre sidewalls, and a faster and cheaper way to apply a trained CNN to new tyre sidewall images at test time with higher accuracy.

DETAILED DESCRIPTION

According to a first aspect, a computer implemented method for classifying one or more embossed and/or engraved markings on a sidewall of a tyre into one or more classes is provided.

Figure 1:
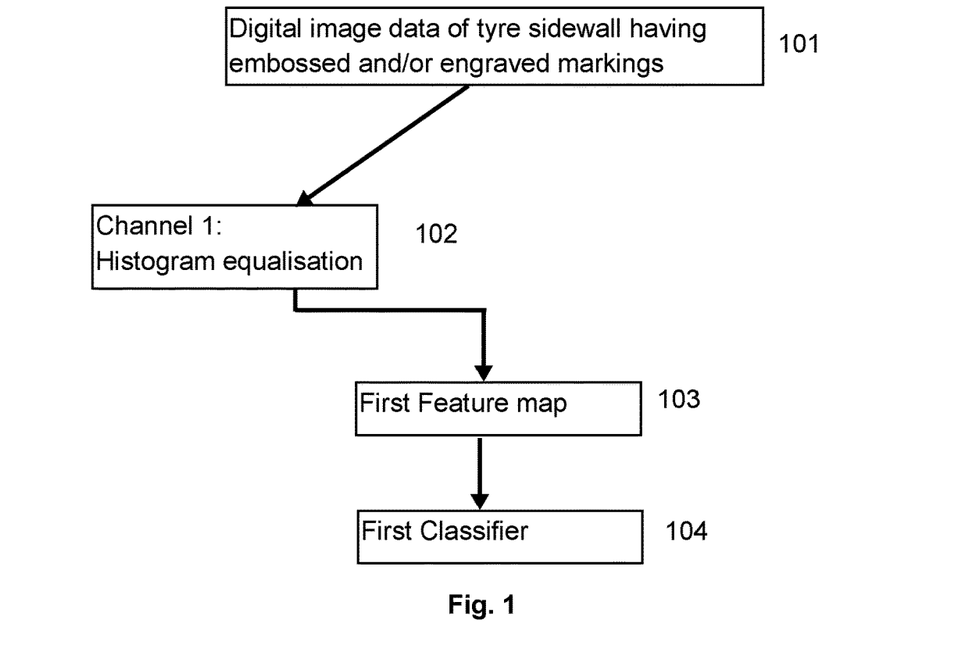
FIG. 1 is a flowchart of a method of classifying embossed and/or engraved markings on a sidewall of a tyre into one or more classes according to an embodiment.

A first embodiment is now described with reference to FIG. 1.

In a first step, digital image data 101 defining a digital image of a sidewall of a tyre is provided.

In a second step, a first image channel 102 is generated from the digital image data 101 by performing histogram equalisation on a first portion of the digital image data 101, the first portion relating to a corresponding first portion of the sidewall of the tyre. The first portion may be the whole of the sidewall of the tyre or some other portion of it.

Histogram equalisation causes areas of lower local contrast in an image to gain a higher contrast and works well where the background and foreground are both bright or both dark, such as in the case of tyre sidewalls having black foreground and background. It may be performed, for example, using functions from any known library of programming functions such as OpenCV, although other libraries will be known to the skilled person. An example of a suitable histogram equalisation function is the OpenCV library "equalizeHist" function. Performing histogram equalisation on the first digital image data 101 to generate the first image channel 102 thus enhances contrast in the data corresponding to areas of low contrast on the tyre sidewall including where the embossed and/or engraved markings are located.

In a third step, a first feature map 103 is generated using the first image channel 102. The first feature map 103 may, for example, be the output of a convolutional layer of a CNN in which a kernel slides over the input first image channel 102. It is envisaged that any suitable CNN architecture may be used which results in a feature map being generated using the first image channel 102. An example architecture which is suitable is that described in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc.

In a fourth step, a first classifier 104 is applied to the first feature map 103 to classify the embossed and/or engraved markings into one or more first classes. Some non-limiting examples of the types of classes into which the embossed and/or engraved markings may be classified include brand logos, tyre types and models, brand symbols, "DOT" codes (a character sequence made up of the letters "D", "O", "T" which for regulatory reasons often precedes other embossed and/or engraved sidewall markings), and the character sequence "5/" (which for regulatory reasons is often a part of the tyre size engraved sidewall markings). In one embodiment, the first classifier 104 may classify the embossed and/or engraved markings into more than 370 different classes thereby enabling different brand logos and symbols to be distinguished from each other, different tyre type and model markings to be distinguished from each other, and the character sequences "D", "O", "T" and/or "5/" to be distinguished from each other and from the other markings on the tyre sidewall. For example, for a given input tyre sidewall image, the first classifier 104 may be used to determine that the embossed and/or engraved markings on the tyre sidewall include one of a plurality of tyre brand logos or symbols, information indicative of a tyre type and model and associated tyre characteristics, the character sequences "D", "O", "T" and/or "5/".

Figure 2:
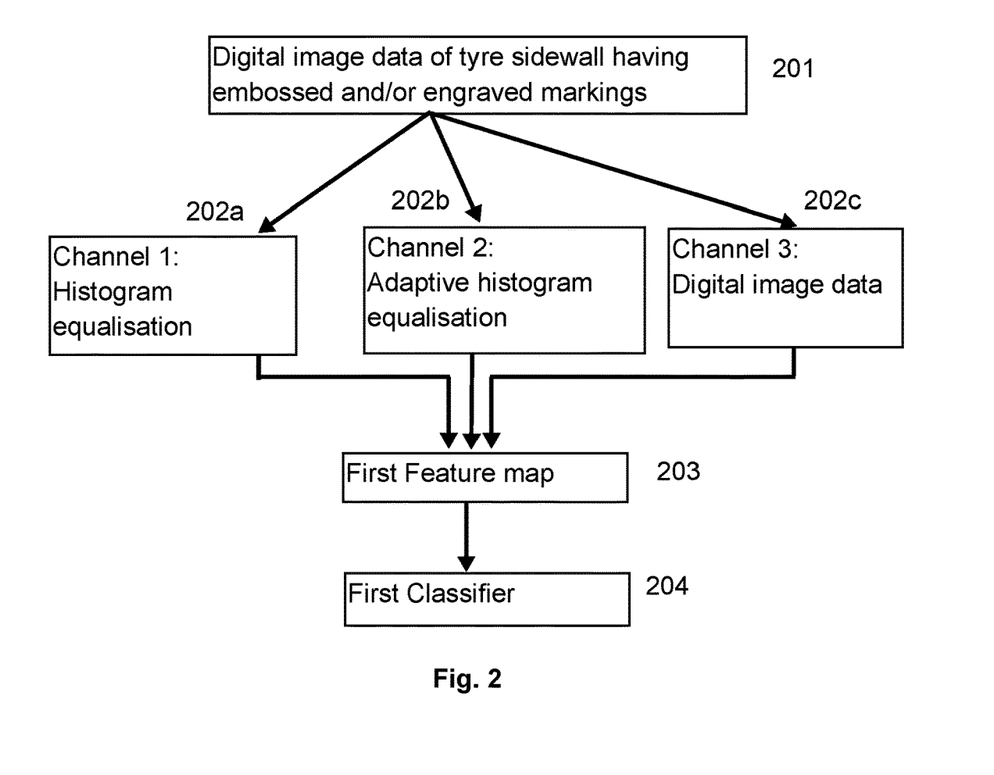
FIG. 2 is a flowchart of a method of classifying embossed and/or engraved markings on a sidewall of a tyre into one or more classes according to an embodiment.

With reference to FIG. 2, a second embodiment is provided.

In a first step which is the same as the first step of the first embodiment, digital image data 201 defining a digital image of a sidewall of a tyre is provided.

In a second step, in the same way as the first embodiment, a first image channel 202a is generated from the digital image data 201 by performing histogram equalisation on a first portion of the digital image data 201. As above, the first portion of the digital image data 201 relates to a corresponding first portion of the sidewall of the tyre which may be the whole of the sidewall of the tyre or some other portion of it.

However, in addition to generating the first image channel 202a as described above, a second image channel 202b and a third image channel 202c are also provided.

The second image channel 202b is generated by performing adaptive histogram equalisation on the first portion of the digital image data 201.

Adaptive histogram equalisation is similar to histogram equalisation in that it improves contrast in images. However, it differs in that it computes several histograms, each corresponding to a distinct section of the image, and uses these to redistribute lightness values of the image. Thus, where histogram equalisation works well where the background and foreground are both bright or both dark, adaptive histogram equalisation works well where the image contains regions that are significantly lighter or darker that the rest of the image. Adaptive histogram equalisation may be performed, for example, using functions from any known library of programming functions such as OpenCV, although others will be known to the skilled person. An example of a suitable adaptive histogram equalisation function is the OpenCV library "IMCLAHE" function. Performing adaptive histogram equalisation on the first digital image data 201 to generate the second image channel 202b thus enhances contrast in the data corresponding to areas which are significantly lighter or darker than most of the image.

In addition to generating the first image channel 202a and generating the second image channel 202b as described above, the digital image data 201 is assigned as the third image channel 202c. Thus, the three channels 202a, 202b, 202c when taken together include image data in which the contrast is enhanced in two different ways (histogram equalisation and adaptive histogram equalisation) as well as the initially provided image data 201. Supplementing the digital image data 201 in this way with two contrast-enhanced image channels was found to be surprisingly effective at reducing training duration and permitting a trained CNN to classify embossed and/or engraved markings which, as described above, inherently have very low contrast and are otherwise challenging to detect and recognise with OCR.

In a third step, a first feature map 203 is generated using the first, second and third image channels 202a, 202b, 202c. As described above in connection with the first embodiment, the first feature map 203 may, for example, be the output of a convolutional layer of a CNN in which a kernel slides over an input. In this case, the input is the first, second, and third image channels 202a, 202b, 202c. It is envisaged that any suitable CNN architecture may be used which results in a feature map being generated using the first, second, and third image channels 202a, 202b, 202c. An example architecture which is suitable is that described in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc.

In a fourth step, which is the same as the fourth step of the first embodiment, a first classifier 204 is applied to the first feature map 203 to classify the embossed and/or engraved markings into one or more of the classes described above in connection with the first embodiment.

Figure 3:
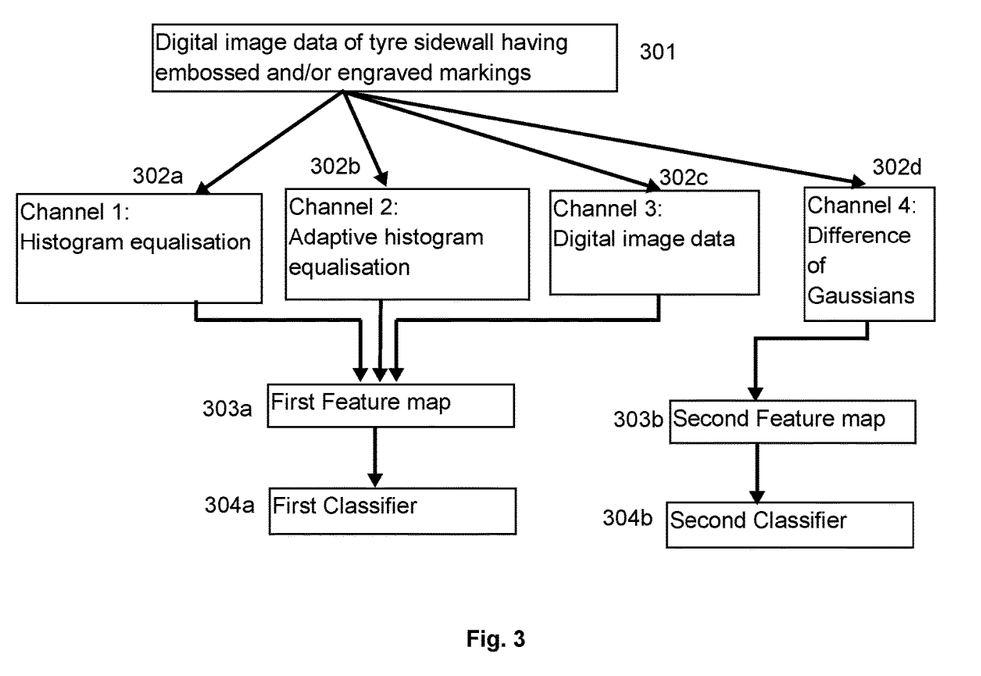
FIG. 3 is a flowchart of a method of classifying embossed and/or engraved markings on a sidewall of a tyre into one or more classes according to an embodiment.

With reference to FIG. 3, a third embodiment which is similar to the second embodiment is provided. In particular, as with the second embodiment, digital image data 301 of a tyre sidewall having embossed and/or engraved markings is provided and the first image channel (histogram equalisation) 302a and second image channel (adaptive histogram equalisation) 302b are generated, and the digital image data 301 is assigned as the third image channel 302c. In the same way as the second embodiment, a first feature map 303a is generated using the three channels 302a, 302b, 302c, and a first classifier 304a is applied to the first feature map 303a to classify the embossed and/or engraved markings into one or more first classes i.e. classes of the type described above, One or more of the embossed and/or engraved markings of the first class may be used as anchors to help localize other embossed and/or engraved markings on the tyre sidewall not in the first classes. These other embossed and/or engraved markings may contain more detailed information relating to, for example, manufacturing plant, age, tyre type or model, intended load, speed rating and size, manufacturing batch information, manufacturer details, and other detailed product information. For example, for regulatory reasons, the "DOT", "5/" or other character sequence may frequently be followed by alphanumeric or other characters specifying the above type of information. Thus, if these anchor character sequences can be found with the first classifier, the approximate location of the other embossed and/or engraved markings in other classes can be localised more efficiently and other locations discarded.

This may be achieved by, in addition to providing the three-channel 302a, 302b, 302c input, first feature map 303a and first classifier 304a, also providing a second classification branch whose purpose is to classify these other embossed and/or engraved markings into other, second classes.

The input to this second classification branch is a fourth channel 302d, which is the only channel in the second classification branch. The fourth channel 302d is generated by applying a difference of Gaussians operation on the first portion of the digital image data 301. Optionally, the first portion is a new image created from the digital image data 301 by cropping to the estimated length of embossed or engraved information proceeding or preceding "DOT" and/ or "5/" anchors. For example, "DOT" typically precedes the remaining embossed and/or engraved markings code which, for example, may be between 14-20 characters long, each character having a similar pixel width. By measuring the character width in pixels of one or more of the characters in the "DOT" anchor, the approximate image width equal to the width of 14 to 20 characters may be determined and used to crop the digital image data to generate the first portion. Considering the "5/" anchor, it typically forms part of tyre size and therefore does not precede the remaining characters but rather appears amongst them. Hence the character width in pixels of "5" in "5/" may be measured and the image cropped to a few character widths (typically 3) preceding the "5/" anchor and several character widths after (typically 14). As defined above, difference of Gaussians is a feature enhancement algorithm which enhances the visibility of edges and other details in a digital image.

From this fourth channel 304d, a separate, second feature map 303b is generated. As with the first feature map 303a, the second feature map 303b may, for example, be the output of a convolutional layer of a CNN in which a kernel slides over an input. In this case, the input is the fourth image channel 302d.

A second classifier 304b, distinct from the first classifier 304a, is then applied to the second feature map 303b to classify the embossed and/or engraved markings into one or more second classes, distinct from the first classes.

Thus, the first classifier 304a can detect and recognise an anchor from which the approximate location of other embossed and/or engraved markings can be inferred, and the second classifier 303b can classify these other embossed and/or engraved markings into second classes. Depending on what classes and what anchors have been chosen, there may be instances where one or more of the second classes are the same as and not distinct from one or more of the first classes. For example, one or more alphanumeric characters may be used as an anchor and at the same time contain information relating to, for example, tyre characteristics, which are classified by the second classifier 304b. In such scenarios, the alphanumeric characters would belong to both the first and second classes. Further whilst symbols and logos have been described herein generally as belonging to the first classes, it is envisaged that they may also belong to the second classes.

Optionally, instead of performing the difference of Gaussians operation on the whole of the first portion of the digital image data 301, it may be performed on only a portion of it. For example, if the first classifier has identified an anchor such as a "DOT" or "5/" character sequence, then it may be inferred that only an area of predetermined height and width of the digital image neighbouring the "DOT" or "5/" character sequence (e.g. within a predetermined distance from the anchor) is likely to contain the embossed and/or engraved markings in the second classes. Thus, the first portion of digital image data may be cropped so that it corresponds to that predetermined area, and the difference of Gaussians operation efficiently performed only on the corresponding patch of image and corresponding portion of the first portion of the digital image data, rather than the whole first portion of the digital image data.

By cropping the image in this way, the resolution of the image on which the difference of Gaussians operation is performed, from which the second feature map 303b is generated, and to which the second classifier 304b, is applied is smaller and thus takes fewer processing resources both during training and at test time.

Thus, in one exemplary implementation, it is envisaged that the first classifier is trained on full, uncropped high resolution images to identify more than 370 first classes such as brand logos, tyre types and models, symbols, and the predetermined character sequences to use as anchors such as "DOT" and/or "5/". However, the first classifier is not trained to identify and distinguish between the character sequences of the second classes which appear adjacent to the anchors and which contain more detailed tyre information such as manufacturing plant, age, tyre type, intended load, speed rating and size, manufacturing batch information, manufacturer details, and other detailed product information. Using the first classifier and the full, uncropped high resolution images for this task would be inefficient as only a small portion of the image (adjacent the anchor) actually contains these character sequences while the rest is empty. Instead, as described above, the second classifier is trained for this task on smaller, cropped images of a predetermined height and width based on the anchor. In this exemplary implementation, the second classifier is trained to identify over 39 second classes such as the alphanumeric characters 0-9 and A-Z, as well as additional classes such as a "/" symbol and/or other symbols used to specify tyre product information.

Further, the inventors found that tyre manufacturers use different techniques to manufacture the embossed and/or engraved markings of logos and symbols in the first classes compared to that of the character sequences in the second classes specifying tyre product information which follow the "DOT" and/or "5/" character sequences. Applying a difference of Gaussians operation to the texture of the logos and symbols was surprisingly found to be detrimental to classifying the logos and symbols into the first classes which are primarily distinguished through texture. Thus, difference of Gaussians is not used in the first classifier branch. In contrast, the difference of Gaussians operations was found to be particularly effective at enhancing edges for the embossed and/or engraved character sequences of the second classes, which are embossed or engraved markings primarily distinguished through edges.

In relation to all of the above embodiments, whilst the "DOT" and "5/" character sequences have been suggested as anchors, other character sequences and/or symbols or other embossed and/or engraved markings may also be used for this purpose.

Optionally, the method of all of the above embodiments may be performed with a Faster R-CNN network as described in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc.

In particular in relation to the third embodiment, the first classifier 304a may be a classifier in a first Faster R-CNN network, and the second classifier 304b may be a classifier in a second Faster R-CNN network, the first Faster R-CNN network being distinct from the second Faster R-CNN network.

Thus, the first Faster R-CNN network identifies and classifies features of the image corresponding to the first classes whilst the second Faster R-CNN does the same but in relation to the second classes.

Each of the first and second Faster R-CNN networks may have its own region of interest generator to generate a plurality of regions of interest in the first and second feature maps.

Each of the first and second Faster R-CNN networks may also have its own bounding box regressor to perform bounding box regression on the respective generated regions of interest to refine their position. Further, as described in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc., a region of interest pooling layer may also be provided which takes input regions of interest of non-uniform size and reshapes them to a predetermined, uniform size. In the case of the third embodiment where the input to the fourth channel (i.e. the only input channel for the second classifier) is to be cropped based on anchors detected by the first classifier, the uniform size of the rectangular regions of interest output by the region of interest pooling layer may be used to calculate an average alphanumeric (or other marking) character length in pixels and thus determine where to crop the image for the fourth channel in the second classification branch so that it captures the embossed and/or engraved markings corresponding to the second classes.

By way of non-limiting example, where a "DOT" anchor is detected, it is expected that 15-18 alphanumeric characters will follow it on the tyre sidewall. For a "5/" anchor, 2-5 characters are expected to precede the "5/" and 12-15 characters are expected to follow the "5/". In each case, the characters are normally around 100 pixels in height. Thus, the images can be cropped and resized accordingly to ensure that all 15-18 and/or 2-5 and 12-15 characters of the sequences around the anchors are retained for the fourth channel. Note that other character sequence lengths and heights may be used to determine by how much the image for the fourth channel should be cropped and/or resized.

Optionally, in relation to all embodiments, the curvature of a tyre in the digital image data may be unwarped such that it is removed from the digital image data which is used to generate the input channels by mapping an image of the curved tyre sidewall to an image where the curve has been removed or straightened. This simplifies any subsequent processing.

Optionally, in relation to all embodiments, some or all of the digital image data may be down sampled by between 50% and 80%. As described above, it is envisaged that the digital image has a high resolution (e.g. around 500×4000 pixels). Applying a trained CNN at test time to such high resolution images is resource intensive and can cause an unacceptable slowdown when the trained CNN is processed/inferred using exclusively CPU based operations. The slowdown would prevent the CNN from achieving acceptable performance while running in real-time. Down sampling the input digital image data significantly reduces the computational resources required but comes at a cost of reduced robustness and ability to generalise. In order to overcome this issue, at training time, a number of the training samples are randomly down sampled between 50%-80% such that the CNN is trained on both full, high resolution images as well as down sampled images. Optionally, slight affine deformations may also be added to some of the training samples to improve generalisation further. The inventors found that a CNN trained in this way was significantly more robust and better at generalising the input images of any resolution, including both the full, high resolution images and images down sampled by between 50%-80%. Thus, where the input images are down sampled at test time by between 50%-80%, the above embodiments can be performed exclusively on a CPU at test time, thus making it possible to run with acceptable performance in real time. Where the embossed and/or engraved markings are large logos, the inventors found that the down sampling effectively shrinks the logos to fit into the receptive field of the CNN, thus improving their detection.

Further, in relation to the third embodiment and where the digital image is cropped to a predetermined height and width in the second classification branch based on one or more anchors identified by the first classification branch, no down sampling is required. This is because the cropping significantly reduces the size of the input image and thus reduces the computational resources required. By way of example, the cropped image may be approximately 100 pixels in height compared to the 500 pixel height of a full, high resolution input image.

According to a second aspect, a computer implemented method for generating a training data set for use in training a classifier to classify one or more embossed and/or engraved markings on a sidewall of a tyre into one or more classes is provided. The method may be used to generate training data to train the classifiers used in the embodiments of the first aspect of the invention. The advantages, technical effects, and features of the embodiments of the first aspect described above apply to and may be combined with the corresponding embodiments of the second aspect.

Figure 4:
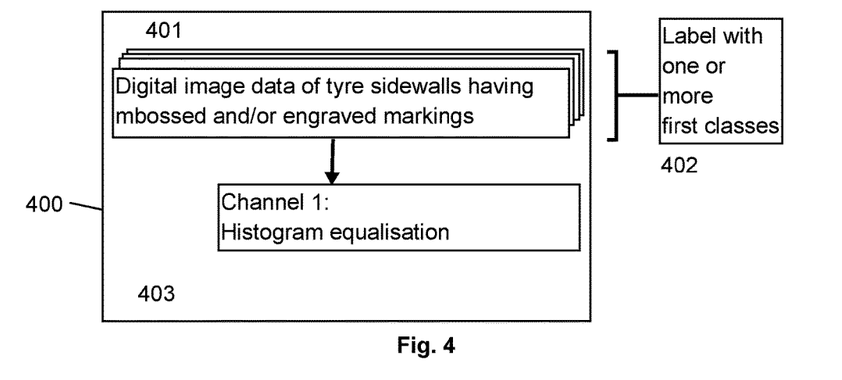
FIG. 4 is a flowchart of a method of generating a training data set for use in training a classifier to classify embossed and/or engraved markings on a sidewall of a tyre into one or more classes according to an embodiment.

With reference to FIG. 4, in one embodiment the method of generating the training data set 400 comprises providing a plurality of digital images and respective digital image data 401 of respective sidewalls of tyres, each sidewall having one or more embossed and/or engraved markings. The method further comprises labelling 402 the respective digital image data 401 with one or more first classes, corresponding to, for example, brand logos, tyre types and models, brand symbols, anchors, or other first classes as described above. For each digital image and respective digital image data 401, a respective first image channel 403 is generated from a first portion of the respective digital image data 401 relating to a corresponding first portion of a respective tyre sidewall. The generation comprises performing histogram equalisation on the first portion of the respective digital image data 401 as described above.

Figure 5:
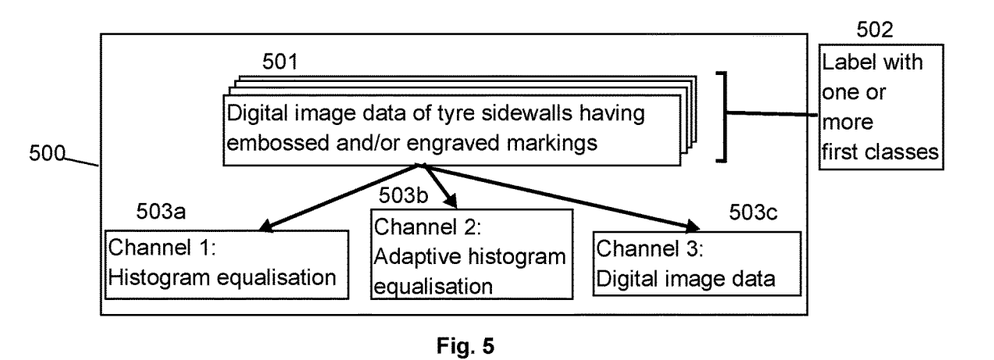
FIG. 5 is a flowchart of a method of generating a training data set for use in training a classifier to classify embossed and/or engraved markings on a sidewall of a tyre into one or more classes according to an embodiment.

With reference to FIG. 5, a further embodiment is described which is similar to the embodiment illustrated in FIG. 4. As with the above embodiment, the method of generating the training data set 500 comprises providing a plurality of digital images and respective digital image data 501 of respective sidewalls of tyres, each sidewall having one or more embossed and/or engraved markings. The digital image data 501 is labelled 502 with one or more first classes and a first channel 503a generated by performing histogram equalisation as described above.

However, additionally, a second image channel 503b and a third image channel 503c are also generated. The second image channel 503b is generated by performing adaptive histogram equalisation on the first portion of the respective digital image data 501. For the third image channel 503c, the first portion of the respective digital image data 501 is assigned as the third image channel 503c. The three channels correspond to those described above in connection with the first aspect.

Figure 6:
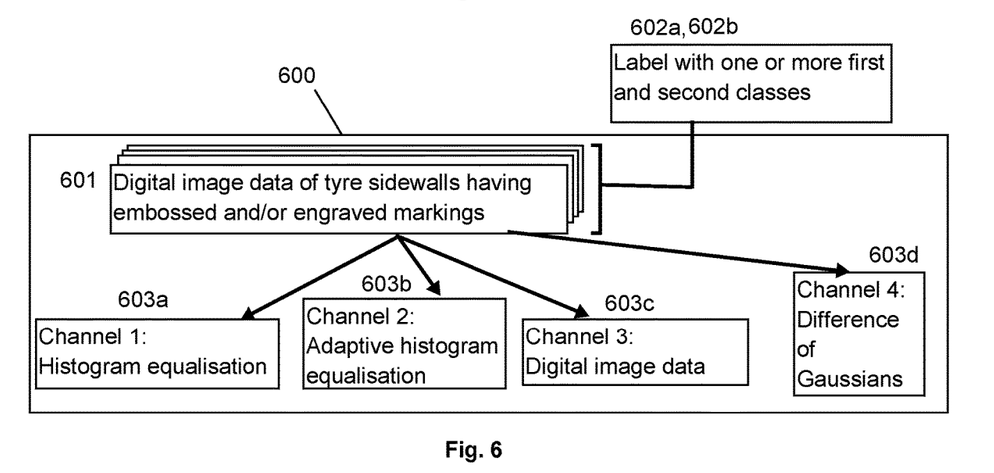
FIG. 6 is a flowchart of a method of generating a training data set for use in training a classifier to classify embossed and/or engraved markings on a sidewall of a tyre into one or more classes according to an embodiment.

With reference to FIG. 6, a further embodiment is described which is similar to the embodiment illustrated in FIG. 5. As with the above embodiment, the method of generating the training data set 600, comprises providing a plurality of digital images and respective digital image data 601 of respective sidewalls of tyres, each sidewall having one or more embossed and/or engraved markings. As above, the digital image data 601 is labelled 602a with one or more first classes and three image channels 603a, 603b, 603c are generated by performing histogram equalisation to generate the first channel 603a, adaptive histogram equalisation to generate the second channel 603b, and assigning the digital image data 601 as the third image channel 603c.

However, additionally, the respective digital image data 601 is labelled 602b with one or more second classes, corresponding to, for example, the alphanumeric characters 0-9 and A-Z, as well as additional classes such as a "/" symbol and/or other symbols used to specify tyre product information as described above in connection with the first aspect of the invention. A fourth image channel 603d is then generated by performing a Difference of Gaussians operation on the first portion respective digital image data 601. As above, the image defined by the digital image data 601 data may be cropped and/or resized according to an anchor prior to performing the difference of Gaussians operation, to improve efficiency.

Optionally, as described above, the curvature of a tyre in the digital image data may be unwarped such that it is removed from the digital image data which is used to generate the input channels by mapping an image of the curved tyre sidewall to an image where the curve has been removed or straightened. This simplifies any subsequent processing.

Whilst it is preferable for as much of the training data to be real, hand labelled/annotated images, this may not always be practical or possible. Optionally in such cases, at least one or more of the plurality of digital images may be synthetically generated i.e. generated using an algorithm to increase the total volume of data available for training. A non-limiting example of how synthetic data may be generated is to take a real, full unwarped image of a tyre sidewall and to pad in text, logos, symbols, and/or other markings corresponding to the desired first and/or second classes in any empty spaces in the real image, thereby increasing the number of (synthetic) embossed and/or engraved markings per image on which the CNN is to be trained. Whilst this technique does not provide much flexibility due to the limited amount of free space on the real image in which to pad in additional markings, the inventors have found it produces surprisingly good results where not enough real, fully hand labelled/annotated training images are available. Optionally, slight affine deformations may also be added to some of the training data images to improve generalisation further.

Optionally, as described above, some or all of the digital image data in the training data may be down sampled by between 50% and 80%. For example, where the digital images of the training data have a high resolution (around 500×4000 pixels), a proportion of them selected randomly may be down sampled by 50% to 80% such that the training data comprises a mixture of full, high resolution images and down sampled images.

An advantage of including down sampled images in the training data set in this way is that it improves the robustness and ability of a CNN trained thereon to generalise to unseen images which also have a lower resolution and/or have been down sampled at test time as at least some equally lower resolution images will have contributed to the training.

Whilst down sampling does slightly compromise the detection of very weak or weak instances of embossed and/or engraved markings such as the "DOT" and/or "5/" anchors where these have worn away, the inventors have found that down sampling to 50% provided a good trade-off between the detection of the embossed and/or engraved markings such as anchors and big logos on the one hand, and efficiency on the other.

As described above in relation to the embodiment of FIG. 3, where, in the fourth channel, the training data images have been cropped and/or resized to be a smaller image patch (e.g. 100 pixels in height and a predetermined number of pixels in width based on the expected character sequence length as described above), no down sampling is necessary as processing the smaller image patch inherently requires less computational power.

According to a third aspect, a computer implemented method for training a classifier to classify one or more embossed and/or engraved markings on a sidewall of a tyre into one or more classes is provided. The method may be used to train the classifiers used in the embodiments of the first aspect of the invention and may use the training data generated by the method of the second aspect of the invention. The advantages, technical effects, and features of the embodiments of the first and/or second aspects described above apply to and may be combined with the corresponding embodiments of the third aspect.

Figure 7:
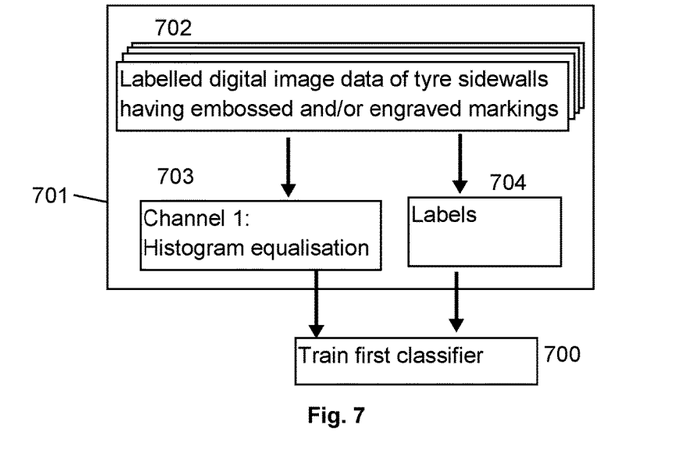
FIG. 7 is a flowchart of a method of training a classifier to classify embossed and/or engraved markings on a sidewall of a tyre into one or more classes according to an embodiment.

With reference to FIG. 7, in one embodiment the method comprises training a first classifier 700 on first training data 701, the first training data 701 comprising a plurality of digital images and respective digital image data 702 of respective sidewalls of tyres, each having one or more embossed and/or engraved markings. The respective digital image data is labelled with one or more first classes such as, for example, brand logos, tyre types and models, brand symbols, anchors, or other classes as described above. Each digital image and respective digital image data comprises a respective first image channel 703 generated by performing histogram equalisation on a first portion of the respective digital image data 702 relating to a corresponding first portion of a respective tyre sidewall. The first classifier is trained 700 using the provided labels 704 and the first image channel 703.

Figure 8:
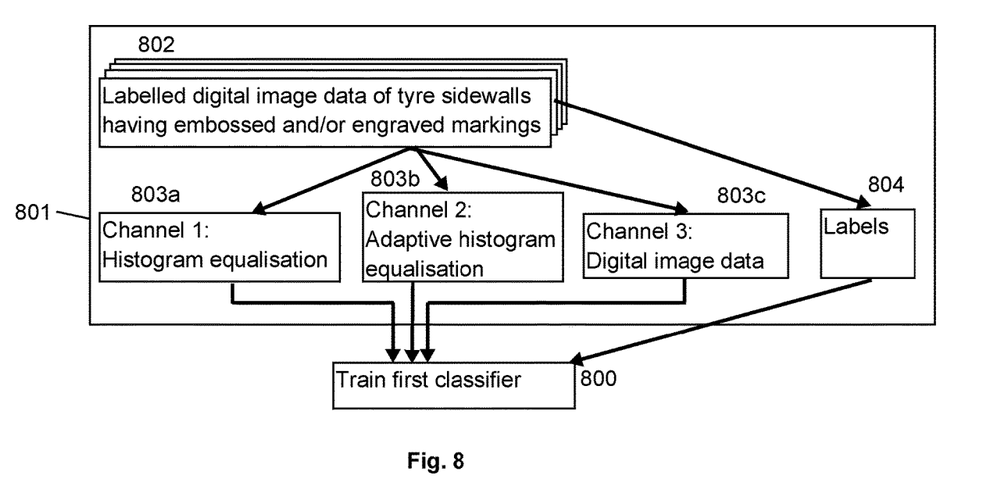
FIG. 8 is a flowchart of a method of training a classifier to classify embossed and/or engraved markings on a sidewall of a tyre into one or more classes according to an embodiment.

With reference to FIG. 8, a further embodiment is described which is similar to the embodiment illustrated in FIG. 7. As with the above embodiment, the method comprises training a first classifier 800 on first training data 801, the first training data 801 comprising a plurality of digital images and respective digital image data 802 of respective sidewalls of tyres, each having one or more embossed and/or engraved markings. The respective digital image data 802 is labelled with one or more first classes as above. Each digital image and respective digital image data 802 comprises a first image channel 803a generated by performing histogram equalisation on a first portion of the respective digital image data 802 relating to a corresponding first portion of a respective tyre sidewall.

However, additionally, as described above in relation to the corresponding embodiment of the first and second aspects of the invention, each digital image and respective digital image data further comprises a second image channel 803b and a third image channel 803c. The second image channel 803b is generated by performing adaptive histogram equalisation on the first portion of the respective digital image data 802 to generate the second image channel 803b. The respective digital image data 802 is assigned as the third image channel 803c. The advantages and effects of using three image channels (histogram equalisation 803a, adaptive histogram equalisation 803b, and digital image data 803c) is explained above in connection with the first and second aspects of the invention. The first classifier is trained 800 using the provided labels 804 and the first, second and third 803a, 803b, 803c image channels.

Figure 9:
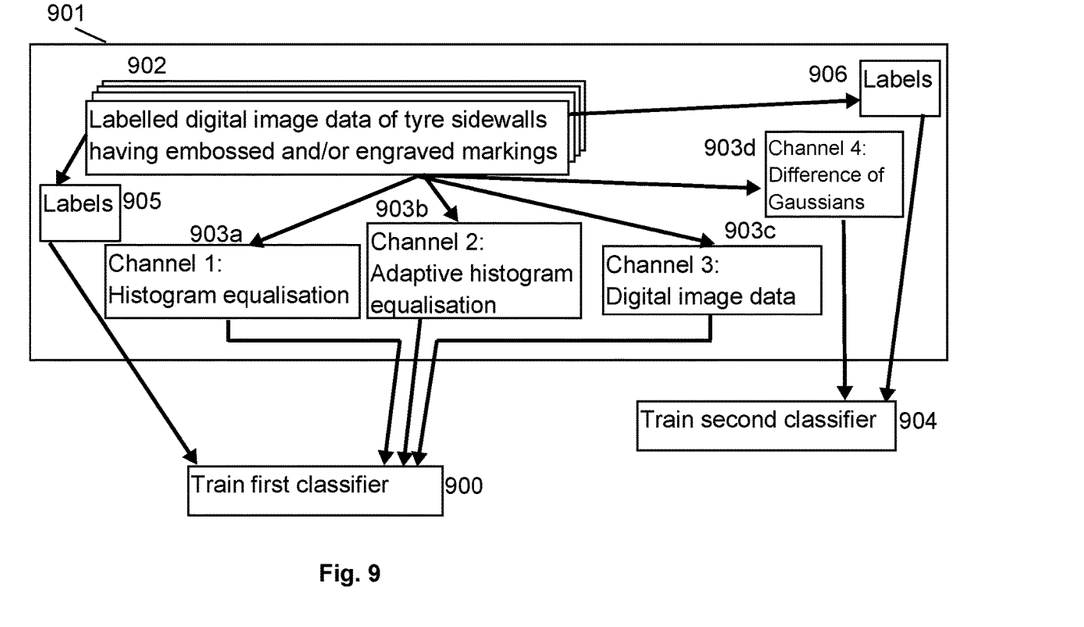
FIG. 9 is a flowchart of a method of training a classifier to classify embossed and/or engraved markings on a sidewall of a tyre into one or more classes according to an embodiment.

With reference to FIG. 9, a further embodiment is described which is similar to the embodiment illustrated in FIG. 8. As with the above embodiments, the method comprises training a first classifier 900 on first training data 901, the first training data 901 comprising a plurality of digital images and respective digital image data 902 of respective sidewalls of tyres, each having one or more embossed and/or engraved markings. The respective digital image data 902 is labelled with one or more first classes as above. Each digital image and respective digital image data 902 comprises the same first, second and third image channels 903a, 903b, 903c as described above.

However additionally, as described above in relation to the corresponding embodiment of the first and second aspects of the invention, the first portion of the digital image data 902 is also labelled with one or more second classes such as, for example, the alphanumeric characters 0-9 and A-Z, as well as additional classes such as a "/" symbol and/or other symbols used to specify tyre product information. Further, a fourth image channel 903d is generated by performing a difference of Gaussians operation on the first portion of the digital image data 902. This may be the whole of the first portion of the digital image data 902 or some other portion of it, for example, only a cropped portion adjacent to and/or neighbouring anchors (i.e. anchors within a predetermined distance) such as the "DOT" or "5/" character sequence. As described above in connection with the corresponding embodiment in the first and second aspects of the invention, this is more efficient as the difference of Gaussians only needs to be performed on much smaller image patches, reducing the processing resources required for training. The first classifier is trained 900 using the provided labels 905 corresponding to the first classes together with the first, second and third 903a, 903b, 903c image channels, and the second classifier is trained 904 using the provided labels 906 corresponding to the second classes together with the fourth image channel 903d.

In relation to all of the above embodiments, any suitable training techniques may be used, for example, those described in Ren, S., He, K., Girshick, R., & Sun, J. (2015). Faster R-CNN: Towards Real-Time Object Detection with Region Proposal Networks. In C. Cortes, N. D. Lawrence, D. D. Lee, M. Sugiyama, & R. Garnett (Eds.), Advances in Neural Information Processing Systems 28 (pp. 91-99). Curran Associates, Inc., and the references contained therein.

Unlike at test time where efficiency and monetary cost are key factors and where it is thus preferable to run all of the method steps on a CPU, at training time a GPU may optionally be used instead. Where the training data comprises high resolution images, a batch size of 1 is normally required to stay within an 8 GB GPU RAM limit (GTX-1080). Larger batch sizes may also be used to improve results but may require GPUs with a higher RAM limit, which are more expensive.

Figure 10:
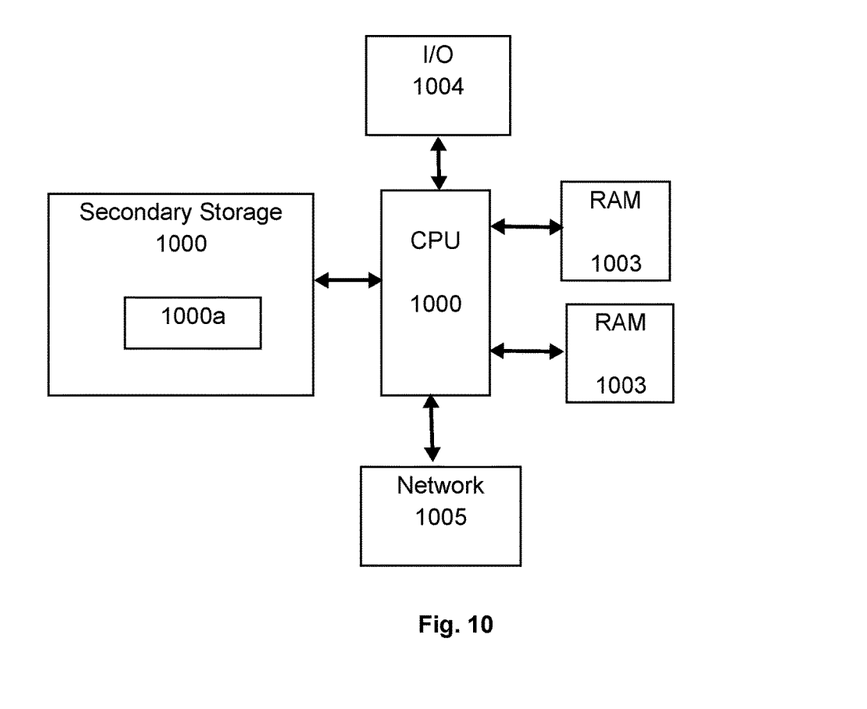
FIG. 10 is a block diagram showing a technical architecture of a data processing apparatus.

Also provided herein, as shown by the technical architecture in FIG. 10, is an exemplary data-processing apparatus comprising means for carrying out the steps of the methods of any of the above embodiments. In some embodiments the steps are carried out entirely on a CPU which is cheaper than a GPU.

The data-processing apparatus may comprise a processor 1000 that is in communication with memory devices including secondary storage 1001 (such as disk drives), read only memory (ROM) 1002, random access memory (RAM) 1003. The processor 1000 may be implemented as one or more CPU chips, which are cheaper than GPUs. The data-processing apparatus may further comprise input/output (I/O) devices 1004, and network connectivity devices 1005.

The secondary storage 1001 is typically comprised of one or more disk drives or tape drives and is used for non-volatile storage of data and as an over-flow data storage device if RAM 1003 is not large enough to hold all working data. Secondary storage 1001 may be used to store programs which are loaded into RAM 1003 when such programs are selected for execution.

In this embodiment, the secondary storage 1001 has an order processing component 1001a comprising non-transitory instructions operative by the processor 1000 to perform various operations of the method of the present disclosure. The ROM 1002 is used to store instructions and perhaps data which are read during program execution. The secondary storage 1001, the RAM 1003, and/or the ROM 1002 may be referred to in some contexts as computer readable storage media and/or non-transitory computer readable media.

I/O devices 1004 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 1005 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 1005 may enable the processor 1000 to communicate with the Internet or one or more intranets. With such a network connection, it is contemplated that the processor 1000 might receive information from the network, or might output information to the network in the course of performing the above-described method operations. Such information, which is often represented as a sequence of instructions to be executed using processor 1000, may be received from and outputted to the network, for example, in the form of a computer data signal embodied in a carrier wave.

The processor 1000 executes instructions, codes, computer programs, scripts which it accesses from hard disk, floppy disk, optical disk (these various disk based systems may all be considered secondary storage 1001), flash drive, ROM 1002, RAM 1003, or the network connectivity devices 1005. While only one processor 1000 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 1000, the RAM 1003, and the ROM 1002 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Also provided herein is a computer program and a computer-readable storage medium for storing the computer program, comprising instructions which, when the program is executed by a computer, cause the computer to carry out the steps of the methods of any of the above embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

For example, it is envisaged that CNNs other than a Faster R-CNN may be used such as Fast R-CNN, R-CNN, SPPNet, SSD, YOLO v1/v2/v3, along with a number of text detection framework such as EAST (Efficient and Accurate Scene Text Detector), CTPN (connectionist text proposal network) text detector etc. In particular, a number of end-to-end detectors (which may be the same type or different types of CNNs) may be placed in cascade to perform the above methods and thereby solve the problem of sidewall marking detection and classification in a cheap and efficient manner as described above.

Further, whilst the Faster R-CNN described above has a VGG16 backbone as described in K. Simonyan, A. Zisserman, Very Deep Convolutional Networks for Large-Scale Image Recognition, arXiv technical report, 2014. Other backbones may also be used such as ResNet50, ResNet100, InceptionNet, AlexNet, and others.

Further, where the digital image data comprises a plurality of images (optionally unwarped) of the tyre sidewall of a single tyre, the accuracy of the above described method for classifying one or more embossed and/or engraved markings on a sidewall of a tyre into one or more classes may be further increased. An example of where a plurality of images might be available is where the digital image data has been obtained by an imaging system which takes a plurality of images of the tyre sidewall as it moves across the field of view of the imaging system, the resulting plurality of images provides a number of different views of the same tyre sidewall and the embossed and/or engraved markings thereon.

In general terms, by performing the method on a plurality of images of the same embossed and/or engraved markings as opposed to a single image, a plurality of classification results is obtained. Each of the classification results is expected to be the same because the plurality of images all relate to the same tyre sidewall and the same embossed and/or engraved markings thereon. Thus, where one or more of the classification results differs from the others, it may be determined to be a false positive or negative result.

In particular, where the digital image data comprises digital image data of a plurality of images of the tyre sidewall, the steps of generating a first image channel, generating a first feature map, and applying a first classifier are performed for each of the images, thereby obtaining a plurality of classification results associated with the embossed and/or engraved markings on the tyre sidewall. Each classification result identifies which of the one or more first classes the embossed and/or engraved markings have been classified into, together with a corresponding plurality of respective confidence levels for each of said one or more identified first classes.

Each confidence level is a value between 0 and 1, where 1 is 100% confidence that the result is a true positive and 0 is 0% confidence that the result is a true positive.

For each of the said one or more first classes in each classification result, the corresponding confidence level may be modified, for example increased, by multiplying it with a scalar constant. In particular, where a confidence level is above a predetermined first threshold (for example, greater than 0.95), it is multiplied by a constant (for example, 3, 4, 5, or any other scalar) to increase it. Where a confidence level is at or below the first threshold, no such multiplication is performed. The multiplication has the effect of boosting the confidence level of the identified classes which already have a high confidence level relative to those which do not. This helps them stand out from identified classes with lower confidence levels and which thus have a higher probability of being false positives or negatives.

After the multiplication has been performed where applicable, the confidence levels of each identified class are accumulated (e.g. by summation) to provide the confidence score for each respective class identified in the plurality of images of that tyre sidewall.

Thus, where a class appears in all of the plurality of images with a confidence level above the first threshold, its associated confidence levels from each of the images will have been multiplied by a constant each time and thus result in a boosted confidence score indicative of a true positive.

In contrast, where a class appears in only one or a few of the images with a confidence level below the first threshold, or in only one of the images with a high confidence level and in the rest with a low confidence level, the resulting accumulated confidence score will be low relative to other confidence scores and thus be indicative of a false positive or a true negative.

In a final step, if a respective confidence score is below a predetermined second threshold, it may be determined that the corresponding one or more identified first classes is a false positive. False positives may optionally be discarded, and the remaining classes retained as true positives. The retained true positives may further be used to, for example, identify a brand of the tyre.

The inventors found that the above method provides a quick and computationally cheap way to increase the accuracy of the method described herein where digital image data comprises a plurality of images of the sidewall of the same tyre. An example implementation of the above technique is now described. A set of labels (i.e. classes) may be set out in a list having the following or other structure:

{"logoLabels":
[
{"brand": "BRAND1", "modelNames" : ["Winter", "Summer", "1337Grip", "brand1_symbol"}, -continued {"brand": "BRAND2", "modelNames" : ["Wet", "Dry", "Sport", "brand2_symbol"] },
...
{ "brand": "OUTSIDE", "modelNames" : ["outside"] },
{ "brand": "ROTATION", "modelNames" : ["Rotation"] },
{"brand": "DOT", "modelNames" : ["D O T"] },
{"brand": "5slash", "modelNames" : [ ] }
]
}

Each brand of tyre may have a number of tyre model's and symbols associated therewith (e.g. "BRAND1" has associated tyre models "Winter", "Summer", "1337Grip", and a symbol "brand1_symbol"). There may also be certain non-brand names, such as "OUTSIDE" or "ROTATION" not uniquely associated with any brand. These are labelled as common tags and, whilst they may belong to the first classes in the first classifier framework and may help to identify certain generic groups of tyre types or inner or outer sides and rotational directions, their presence does not necessarily help to distinguish between tyre brands. Labelling these types of markings as common tags means they can optionally be discarded if they are detected at test time. Anchor classes such as "DOT" and "5/" are also included in the list. If a given embossed and/or engraved marking has multiple distinct appearances (e.g. a brand's logo or text might have changed over time so different versions of it might exist), multiple classes of that embossed and/or engraved marking may also be added to the list. Certain other types of embossed and/or engraved markings are also given unique tags where they are unique to a given tyre brand. For example, there may be unique figures on a tyre sidewall showing instructions of how the tyre is to be stored inside or outside. Given the uniqueness of such figures, they may be particularly helpful to distinguish between tyre brands.

The above list thus shows all the classes which the first classifier may classify the embossed and/or engraved markings into. The structure of the list indicates how the classes relate to each other and/or any associated brands, especially, how the symbols, tyre models and unique tags are related to its brand.

At test time, the list structure is initialised, and the first classifier is applied to the plurality of images of the tyre sidewall. For each detection of a class, the list is searched for the detected class and the associated confidence level for that detection added to a cumulative score for that class. As describe above, if the confidence level is high (e.g. greater than 0.95) it is multiplied by a constant before being added to the cumulative confidence score. The accumulated confidence scores for each detected class in the list are thereby generated.

It is expected that there will be multiple detections of the same classes because the same markings are being detected in each of the plurality of images i.e. a detection redundancy is built into the system where the same markings are being detected a number of times. The accumulated confidence scores associated with classes detected multiple times will thus also be high and a consensus is developed that these multiple detections are true positives. In contrast, false positives are very unlikely to be detected multiple times so their cumulative confidence scores will be low, and no consensus will be developed.

When all of the plurality of images has been processed in this way, the accumulated confidence scores indicate which classes have been correctly detected. As the list structure also indicates whether or not a detected class is associated with a given tyre brand, confidence scores of all detected classes associated with a given brand may be aggregated. The brand with the highest aggregate score may be used to determine what the brand is of the imaged tyre.

Further, once a tyre brand is determined, the tyre model name may be determined by searching through the confidence scores associated with classes indicative of the tyre model for the highest score. Typically, this will exclude detections of brand symbols, and common tags which are not indicative of a unique tyre model.

What is claimed is:

1. A computer implemented method for classifying one or more embossed and/or engraved markings on a sidewall of a tyre into one or more classes, the method comprising:
   (i) providing digital image data of the sidewall of the tyre;
   (ii) generating a first image channel, a second image channel, and a third image channel from a first portion of the digital image data relating to a corresponding first portion of the sidewall of the tyre, wherein
      the generating the first image channel comprises: performing histogram equalisation on the first portion of the digital image data to generate the first image channel;
      the generating the second image channel comprises: performing adaptive histogram equalisation on the first portion of the digital image data to generate the second image channel; and
      the generating the third image channel comprises: assigning the first portion of the digital image data as the third image channel;
   (iii) generating a first feature map using the first image channel, the second image channel, and the third image channel; and
   (iv) applying a first classifier to the first feature map to classify the embossed and/or engraved markings into one or more first classes.

2. The method according to claim 1, further comprising:
   performing a difference of Gaussians operation on the first portion of the digital image data to generate a fourth image channel;
   generating a second feature map using the fourth image channel; and
   applying a second classifier to the second feature map to classify the embossed and/or engraved markings into one or more second classes.

3. The method according to claim 2, wherein the first classifier is a classifier in a first Faster R-CNN network, and the second classifier is a classifier in a second Faster R-CNN network, the first Faster R-CNN network being distinct from the second Faster R-CNN network.

4. The method according to claim 3, wherein
   the first Faster R-CNN network comprises a first region of interest generator, and
   the method comprises:
      with the first region of interest generator, generating a plurality of first regions of interest on the first feature map, and applying the first classifier to the plurality of generated first regions of interest.

5. The method according to claim 4, wherein
   the second Faster R-CNN network comprises a second region of interest generator, and
   the method comprises:
      with the second region of interest generator, generating a plurality of second regions of interest on the second feature map, and applying the second classifier to the plurality of generated second regions of interest.

6. The method of claim 5, wherein
   each of the first Faster R-CNN network and the second Faster R-CNN network comprises a respective-bounding box regressor, and
   the method comprises:
      with the respective bounding box regressors, performing bounding box regression on the plurality of respective first regions of interest and/or the plurality of respective second regions of interest to refine a position of one or more of the plurality of first regions of interest and/or the plurality of second regions of interest before applying the first classifier and/or the second classifier to the plurality of generated first regions of interest and/or the plurality of generated second regions of interest.

7. The method according to claim 1, wherein the sidewall of the tyre has a curvature, and wherein the providing digital image data comprises unwarping the curvature.

8. The method according to claim 1, further comprising down sampling the digital image data by between 50% and 80%.

9. The method according to claim 1, wherein the method is performed on a CPU.

10. The method according to claim 1,
    wherein the digital image data comprises digital image data of a plurality of images of the sidewall of the tyre;
    wherein the generating the first image channel, the generating the first feature map, and the applying the first classifier are respectively performed in respect of each respective image of the plurality of images to provide a plurality of classification results, the plurality of classification results identifying which of the one or more first classes of the embossed and/or engraved markings have been classified into and a plurality of corresponding confidence levels for each of the one or more identified first classes; and
    determining based on the confidence levels that one or more of the identified first classes are false positives.

11. The method according to claim 10, further comprising:
    for each of the one or more identified first classes in each of the plurality of classification result, modifying the corresponding confidence level by multiplication with a constant if the confidence level is above a first threshold.

12. The method according to claim 11, further comprising:
    for each of the one or more identified first classes, adding the corresponding confidence levels to generate a respective confidence score; and
    if a respective confidence score is below a second threshold, determining based on the confidence score that the one or more of the identified first classes are false positives.

13. A computer implemented method for generating a training data set for use in training a classifier to classify one or more embossed and/or engraved markings on a sidewall of a tyre into one or more classes, the method comprising:
    providing a plurality of digital images and respective digital image data of respective sidewalls of tyres, each sidewall having one or more embossed and/or engraved markings;
    labelling the respective digital image data with one or more first classes; and
    generating a first image channel, a second image channel, and a third image channel from a first portion of the digital image data corresponding to a first portion of a respective tyre sidewall, wherein
the generating the first image channel comprises: performing histogram equalisation on the first portion of the digital image data to generate the first image channel;
the generating the second image channel comprises: performing adaptive histogram equalisation on the first portion of the digital image data to generate the second image channel; and
the generating the third image channel comprises: assigning the first portion of the digital image data as the third image channel.

14. The method according to claim 13, further comprising:
labelling the digital image data with one or more second classes, and
wherein the respectively generating the second image channel and the third image channel comprises:
performing a difference of Gaussians operation on the first portion of the digital image data to generate a fourth image channel.

15. The method according to claim 13, wherein the sidewalls of tyres have a curvature, and wherein the providing a plurality of digital images and respective digital image data comprises unwarping the curvature.

16. The method according to claim 13, wherein at least one of the plurality of digital images is synthetically generated.

17. A computer implemented method for training a classifier to classify one or more embossed and/or engraved markings on a sidewall of a tyre into one or more classes, the method comprising:
training a first classifier on first training data, the first training data comprising, for each of a plurality of tyre sidewalls, digital image data derived from a digital image of a first portion of the tyre sidewall, each tyre sidewall having one or more embossed and/or engraved markings;
wherein the digital image data is labelled with one or more labels, each label being indicative of the tyre including a marking in one of a plurality of first classes,
wherein the digital image data has a first image channel, a second image channel, and a third image channel, and
wherein the first image channel is generated by performing histogram equalisation on the first portion of the corresponding digital image data, the second image channel is generated by performing adaptive histogram equalisation on the first portion of the digital image data, and the third image channel is generated by assigning the first portion of the digital image data as the third image channel.

18. A non-transitory computer-readable storage medium having stored thereon a computer program, that when the computer program is executed by a computer, causes the computer to carry out the method of claim 1.

* * * * *